(12) United States Patent
Korson

(10) Patent No.: US 8,087,675 B2
(45) Date of Patent: Jan. 3, 2012

(54) CHUCK HOLDER INCORPORATING INDEPENDENT ARRAYED WEDGE CLAMPS FOR CLAMPING SUCH AS IRREGULARLY SHAPED AND THIN WALL PARTS WITH A MINIMUM OF DEFORMATION

(76) Inventor: Daniel G. Korson, Traverse City, MI (US)

( * ) Notice: Subject to any disclaimer, the term of this patent is extended or adjusted under 35 U.S.C. 154(b) by 1092 days.

(21) Appl. No.: 11/891,801

(22) Filed: Aug. 13, 2007

(65) Prior Publication Data
US 2008/0048404 A1 Feb. 28, 2008

(51) Int. Cl.
*B23B 31/30* (2006.01)
(52) U.S. Cl. .................... 279/4.12; 279/121; 279/134
(58) Field of Classification Search ............... 279/4.07, 279/4.1, 4.11, 4.12, 110, 121, 134; *B23B 31/30*
See application file for complete search history.

(56) References Cited

U.S. PATENT DOCUMENTS

| | | | | |
|---|---|---|---|---|
| 2,980,432 A | * | 4/1961 | Benson | 279/4.12 |
| 3,076,662 A | * | 2/1963 | Kostyrka | 279/4.11 |
| 3,630,535 A | | 12/1971 | Renoux | |
| 3,814,451 A | * | 6/1974 | Rohm | 279/121 |
| 4,026,566 A | | 5/1977 | Rohm | |
| 4,249,459 A | * | 2/1981 | Pruden | 92/106 |
| 4,275,892 A | * | 6/1981 | Rohm | 279/130 |
| 4,349,207 A | * | 9/1982 | Fink | 279/4.12 |
| 4,411,440 A | * | 10/1983 | Becker | 279/5 |
| 4,424,977 A | * | 1/1984 | Pruden et al. | 279/121 |
| 4,482,162 A | | 11/1984 | Anegawa | |
| 4,527,808 A | | 7/1985 | Hiestand | |
| 4,799,837 A | | 1/1989 | Vollmer | |
| 4,872,691 A | * | 10/1989 | Rohm | 279/123 |
| 4,993,255 A | * | 2/1991 | Treillet | 72/462 |
| 5,102,152 A | | 4/1992 | Grund et al. | |
| 5,158,307 A | | 10/1992 | Toyano et al. | |
| 5,326,114 A | | 7/1994 | Piotrowski | |
| 6,017,266 A | | 1/2000 | Tabachenko | |
| 6,397,712 B1 | * | 6/2002 | Rohm | 82/165 |
| 6,464,235 B2 | | 10/2002 | Rohm | |
| 6,568,694 B1 | | 5/2003 | White | |
| 7,311,312 B2 | * | 12/2007 | Nishimiya et al. | 279/121 |

FOREIGN PATENT DOCUMENTS

JP 01264703 A * 10/1989

* cited by examiner

*Primary Examiner* — Eric A Gates
(74) *Attorney, Agent, or Firm* — Douglas S. Bishop

(57) ABSTRACT

A work holder assembly for use in clamping a workpiece being machined. A chuck includes a fixed sleeve about which is mounted a rotatable collet. A plurality of individual clamps extend from circumferential spaced locations associated with the collet. The clamps each include a first spring biased and linear traveling component actuating a second radially traveling and adjustable component into engagement with annular disposed locations of the workpiece. Each the clamps exhibits a wedge shape at an interface between the linear and radial components, both in order to minimize clamping forces and to prevent backdriving of the clamps by the tooling. A fluid pressure extends through a location in the chuck, the collet further having a fluid delivery component in communication with the fluid supply and which is in contact with workpiece engaging locations, to overcome the spring bias of said pin in a fluid actuated release condition.

13 Claims, 5 Drawing Sheets

CHUCK HOLDER INCORPORATING INDEPENDENT ARRAYED WEDGE CLAMPS FOR CLAMPING SUCH AS IRREGULARLY SHAPED AND THIN WALL PARTS WITH A MINIMUM OF DEFORMATION

BACKGROUND OF THE INVENTION

1. Field of the Invention

The present invention relates generally to tool chuck assemblies, such as in particular those adapted to rigidly clamp workpieces exhibiting thin wall cross sections. More specifically, the present invention discloses an improved tool part locking chuck exhibiting a plurality of independent and circumferentially arrayed wedge clamps for gripping selected locations of an irregular and often thin walled workpiece. The chuck holder may incorporate multiple spring, pneumatic or hydraulic clamping pressure, uniformly spread across all of the circumferentially arrayed wedge clamps, and with the effect of both increasing the amount of contact points (and corresponding clamping pressure) concurrent with reducing or eliminating part deformation.

2. Description of the Prior Art

The prior art is well documented with varying types of lathe chuck holding assemblies, such as which are associated with a rotary driven and spindle supported assembly for permitting a stationary positioned tool to machine given surfaces associated with a clamped workpiece. A first example is set forth in U.S. Pat. No. 6,464,235, issued to Rohm, and which teaches a latch chuck having a chuck body centered on and rotatable about a main axis. The chuck is formed with a plurality of radially extending jaw-guide grooves and, transverse to the grooves, with respective guide passages each in turn formed with an abutment. Respective jaws are displaceable in the grooves with each having at least one tooth exposed in the respective guide passage and respective control rods displaceable along the passages each having at least one tooth meshing with the tooth of the respective jaw. A control pin is axially displaceable in each rod between an extended position projecting into the respective jaw-guide groove and a retracted position. A latch pin is axially displaceable in each rod between an extended latching position engaging the respective rod in the respective passage and a retracted position permitting such movement. A spring urges the pins into their extended positions, and a coupling member engaged between the pins displaces the respective latch pin into the respective retracted position on displacement of the control pin into its retracted position. Thus, when there is no jaw in the guide groove, the latch pin of the respective control rod latches the same against movement in the respective passage.

U.S. Pat. No. 4,026,566, also issued to Rohm, teaches a chuck for latches and other machine tools having a chuck body provided with axially shiftable wedging members to actuate the jaws, a rotatable guard ring prevents full axial withdrawal of these members from sockets in the jaws in one angular position of the ring. In another angular position of the ring, recesses in the latter are aligned with the wedging members to allow the latter to clear the jaws for radial withdrawal and replacement thereof.

Japanese Patent Publication JP2001/038510 teaches a machine tool chuck exhibiting a pair of movable wedge bars driving a plurality of clamp jaws arranged inside a guide notch of radial direction of a chuck body and intersecting the guide notch inside a wedge bar picket inside the chuck body to form worm gears with rows of gear teeth meshing with corresponding gear cut groove parts of the clamp jaws. A lock slider is incorporated in each wedge bar with a lock pin rod movably guided in parallel to a chuck axis arranged therein. A plurality of lock sliders are capable of moving the lock pin rods having the rows of gear teeth from a lock position maintaining an engaged state with the clamp jaws to an exchange position enabling exchange of the clamp jaws. In such a case, securing pin rods are movable in the axial direction, receiving the force of the springs and being pressed toward the clamp jaws arranged inside the lock pin rods.

U.S. Pat. No. 5,158,307, issued to Toyano et al., teaches a machine tool chuck in which a wedge member is provided to cause radial displacement or workpiece clamping pawls for replacement. The replacement can be made with minimum variations in radial position at which the clamping pawls are relocated. To this end, the clamping pawls and slide blocks are slidably guided radially through a chuck body independently of each other. Each clamping pawl and each slide block are in slidable engagement with a sloping wedge action portion of an axial slidable wedge bar in such a way that the clamping pawl and slide block move radially independently of each other while maintaining a geometric relationship there between. For replacement of the clamping pawl, the wedge bar is moved backward to cause its wedge action portion to be disengaged from the clamping pawl whereby the clamping pawl can be slid radially outwardly for replacement.

Finally, U.S. Pat. No. 4,799,837, issued to Vollmer, teaches a multi-component chucking system, in particular for concentric or true rotation tools, and having a receiving body optionally having a chucking shaft, with an engagement surface extending at right angles to the axis of rotation and a coaxial retention bore as well as a tool element, preferably embodied as a tool holder. On its end face, the tool element also has an engagement surface at right angles to the axis of rotation and is formed with a coaxial retention stub fitting into the retention bore, by means of which stub the tool element can be centered with respect to the receiving body. A chucking pin is associated with the retention stub and coaxial with the axis of rotation, along with chucking means actuable from outside the receiving body, allowing the clamping together of the tool element and the receiving body. The chucking means have two radially movably supported locking elements which have locking surfaces by which, in a chucking position, wedge-like surface regions of the chucking pin that are inclined with respect to the axis of rotation are engaged from below. These wedge-like surface regions of the chucking pin are located on a single common conical surface region that is coaxial with the axis of rotation and forms an acute angle with it.

SUMMARY OF THE PRESENT INVENTION

A work holder assembly for use in clamping a workpiece being machined. The assembly includes a chuck having a fixed sleeve, and about which is mounted a rotatable collet. Typically, a bearing supported collar or the like facilitates rotatable support of the collet relative to the fixed sleeve.

A plurality of individual clamps extend from circumferential spaced locations associated with the collet. The clamps each include a first spring biased and linear traveling component, in turn actuating a second radially traveling and adjustable component into engagement with annular disposed locations of the workpiece. Each of the clamps exhibits a self-locking wedge-like shape at an interface between the linear and radial components, this occurring both in order to minimize individual clamping forces over a number of independent clamps applied to various locations of such as thin walled and irregular shaped workpieces, so as to provide a normal net force, as well as to prevent backdriving of the clamps by the tooling.

The wedge shaped clamps may further specifically include arcuate extending end projections associated with the linear pin which seat within a matingly configured recessed interior within the radial projecting lock pins, and in order to actually displace the pins into contact locations with the workpiece. A fluid pressure extends through a location in the chuck, the collet further having a fluid delivery component in communication with the fluid supply and which is in contact with workpiece engaging locations. The forces associated with the fluid pressure or, alternatively with a suitable mechanical pressure, can in one application operate to provide a constant balancing force along all of the clamps and, in a reversed application, is directed to overcome the spring bias of the lock pin to fluidly actuate release of the clamps. Said clamps may also be mechanically released.

Additional applications of the work holder assembly also include providing a collet exhibiting additional and linear extending depth for supporting one or more additional clamps in a linearly spaced manner from an initial ring array of such clamps. In this fashion, the assembly is configured to clamp workpieces exhibiting additional depth in which a single clamping ring array may not adequately function.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

Figure 1:
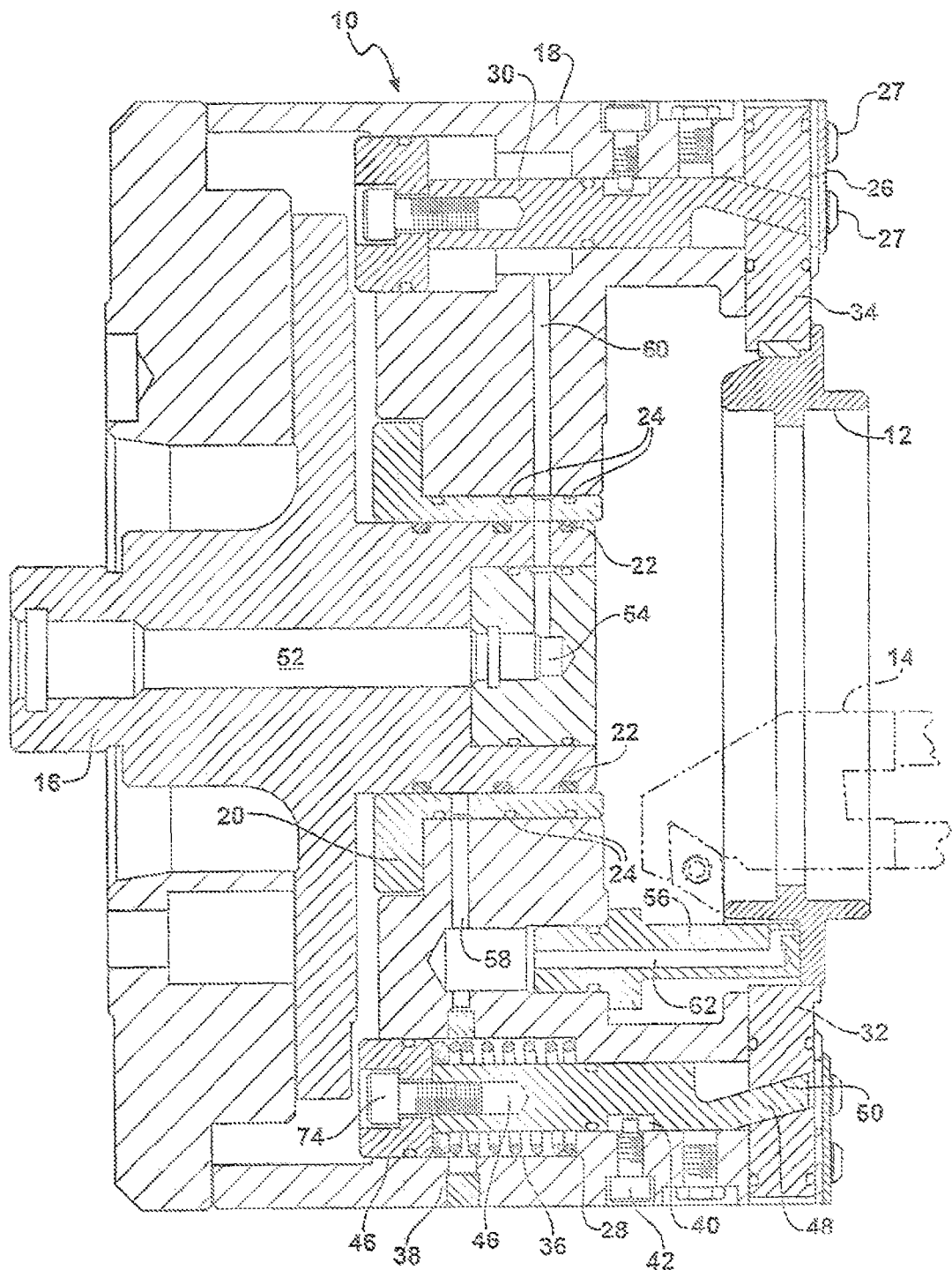
FIG. 1 is a cutaway view of the chuck assembly and illustrating first and second selected lock pins in engagement with annular locations associated with an irregular shaped workpiece according to the present invention.

Referring now to FIG. 1 is a cutaway view illustrated generally at 10 of a work holder assembly. As previously discussed, the work assembly teaches a plurality of independent clamps for securing, such as a thin walled and irregular shaped workpiece 12, for machining by an appropriate tooling (see in phantom at 14 and which may include such as a carbide, diamond or other suitable cutting surface or insert). It is also contemplated that the work holder assembly 10 is capable of being utilized with any type of workpiece 12, not limited to that illustrated herein.

Additional features of the work holder assembly include a fixed central sleeve 16, about which is rotatably supported a collet assembly 18. A rotary support collar 20 is provided in interdisposed fashion between the fixed sleeve 16 and the collet 18 and, with the provision of inner and outer bearings, such as shown at 22 and 24 respectively, facilitate rotation of the collet 18.

The collet typically supports the workpiece to be machined and includes an annular shaped end cover plate 26 such as typically secured to the collet 18 by fasteners 27. Without limitation, it is also contemplated that the work holder assembly may function in a non-rotating embodiment, and such as by it securing a stationary workpiece for machining by a moving tool.

The collet 18 supports a plurality of clamps in independent and typically circumferentially arrayed fashion about a periphery of the workpiece 12. Each clamp includes a subassembly consisting of a linearly displaceable and biased (e.g. spring loaded) pin, see at 28 and 30, which coacts with associated and radially displaceable locking pins, see further at 32 and 34, these being actuated into locking position with circumferential locations associated with the workpiece 12.

Figure 2:
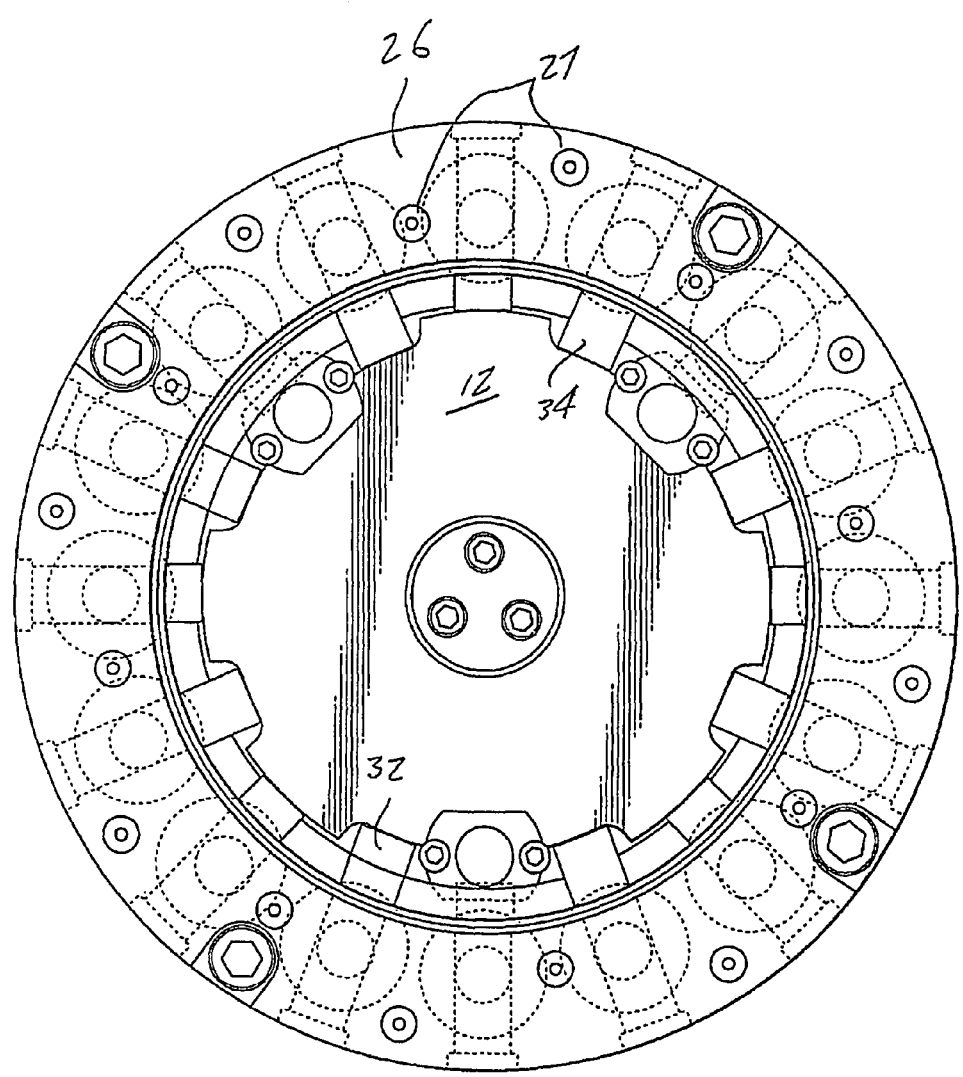
FIG. 2 is an end/bottom view of the chuck assembly illustrated in FIG. 1 and illustrating the multiple independent and varying nature of the annular arrayed lock pins in engagement with corresponding circumferential locations of the irregular shaped workpiece.

As is further referenced by the end/bottom view of FIG. 2, an objective is to provide a plurality of independent clamps and illustrating the multiple independent and varying nature of the annular arrayed lock pins in engagement with corresponding circumferential locations of the (irregular shaped) workpiece. The ability to grip a workpiece at a number of locations, such clamps capable of working independently or with a common applied gripping force, increases the ability of the assembly to grip the part at irregular surface locations, and with lesser exerted point contact pressure.

A feature associated with each clamping assembly is the incorporation of a wedge-shaped interface between the linearly displaceable (wedge) pins, 28 and 30 and coacting radially displaceable lock pins 32 and 34. As illustrated in FIG. 1, the wedge pin 28 includes a cavity 36 within which is mounted a spring mechanism 38.

It is contemplated that the linear displaceable pins may each or selectively be pre-biased in a given (locking) direction through the incorporation of a mechanical bias. Alternatively, the linearly traversable pins may be actuated by a pressurized fluid source, and as will be subsequently described, may operation in conjunction or separately from a spring loading component associated with the linearly traversable pin (see pin 30 in FIG. 1 not including an associated coil spring) functions to traverse and to hold the pins in a given direction and at a given force.

Figure 3:
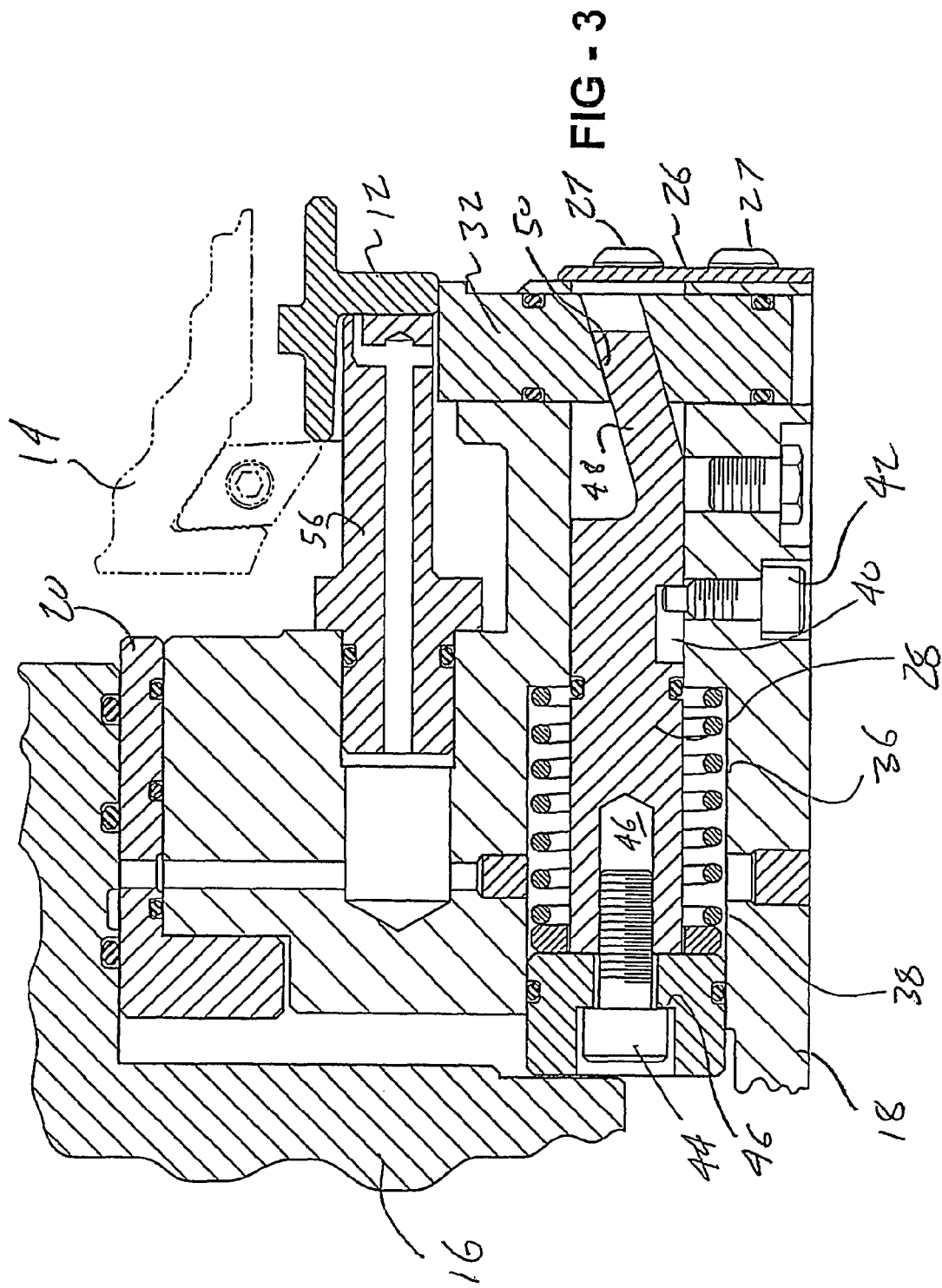
FIG. 3 is an enlarged partial view of a selected clamping location associated with the cutaway illustration of FIG. 1 and better illustrating the clamping relationship established by the arrangement of the selected wedge clamp and locking pin against the associated surface of the workpiece.

Referencing FIG. 3 in cooperation with FIG. 1, an enlarged partial view of a selected clamping location is shown associated with the cutaway illustration of FIG. 1 and better illustrating the clamping relationship established by the arrangement of the selected wedge clamp and locking pin (see again elements 28 and 32) against the associated surface of the workpiece 12. The linear traveling pin 28 exhibits an exterior recess surface 40 within which is seated a side disposed pin 42, this defining a limited range of displacement of the pin 28.

A threaded adjustment bolt 44 extends from an end of the pin 28 opposite the radially traveling component (or associated lock pin 32) and in order to define a range of adjustment or travel of the lock pin 32 (within the overall range specified by the recessed surface). The head of the bolt 44 is shown shouldered against a fixed end wall surface 46 against which an inner end of the pin 28 abuts, further such that the threaded shaft end can be rotatably interengaged relative to an interior pocket 46 defined in linearly extending direction within the pin 28 and in order to define a range of actuation of (each of) the linearly traversable pins.

The linear traversable pin 28 exhibits an arcuate projecting end portion, see at 48. The corresponding radial traveling lock pin 32 further exhibits a recessed interior 50, see as shown in the cutaway of FIGS. 1 and 3, and through which extends the arcuate end portion 48 of the linear traveling pin 28. Actuation of the pin 32 in a lengthwise direction towards the end cover plate 26 results in the arcuate extending portion 48 coacting against the recessed surfaces (or interior aperture) defined in the radially directed lock pin 32 and, in cooperation with the adjusted range displacement associated with the linear pin 28, determines a range if radial and clamping engagement by the lock pin (see again FIG. 2 and which illustrates a variety of lock pins associated with different ranges of radial actuation to secure against locations of the workpiece being held).

The ability to clamp a workpiece at as many contact points as possible, combined with the incorporation of a wedge or irregular shaped coaction between respective linear and radial displaceable components associated with each clamp, renders possible the application of a minimal force to clamp a part, while still locking that part into position, this again due to increasing the number of contact points with the workpiece. The further advantage derived from this arrangement is the reduction or avoidance of part deformation resulting from extreme clamping forces (a significant problem with in particular thin-walled workpieces).

The wedge arrangement illustrated by the arcuate projecting end 48 of associated linear pin 28 illustrates only one arrangement, it being understood that other wedge, cam or irregular surface designs can be incorporated into an interface between the linear 28 and radial 30 clamp elements, and in order to achieve the above-discussed objectives, while preventing the tooling from backdriving the radial lock pins and linear slide pins out of contact with the workpiece 12.

A fluid pressure supply tube 52 extends through a central location associated with the fixed sleeve portion 16 of the chuck. An outermost extending pressure supply nozzle 54 (embedded within the body of the chuck assembly 10) is in fluidic communication with the collet through a fluid delivery component, see at 56, this in turn being in communication with the fluid supply tube 52 via a fluid conducting passageway 58. Referencing in particular FIG. 1, a further fluid conducting passageway 60 may also communicating the central supply tube 52 with the secondary linear actuating pin 30 in a further arrangement and absent the provision of a pre-spring loading component as is shown for sliding pin 28.

In the initial engagement condition referenced in FIGS. 1 and 3, either or both a combination of spring loaded pressure (see coil spring 38 for pin 28) or fluid clamping pressure, see passageways 58 and 60, are provided to actuate the sliding pins and to thereby apply a selected degree of clamping pressure to the lock pins (e.g. at 32 and 34) in their clamping engagement with the annular locations of the workpiece 12. The pressure includes that derived from such as pneumatic or hydraulic fluid forces, it being understood that other mechanical means may also be employed in place of fluid pressure to actuate the linear and radial clamping elements in either of first and second directions.

A common manifold can be incorporated into the collet 18, and which may include such as the rotary support collar 20 feeding pressurized fluid from an exterior source (not shown) to individual fluid delivery components (or a modified single delivery component communicable with all of the linear actuating sliding pins associated in turn with all of the annularly arrayed clamps). The use of hydraulic or pneumatic actuation can precisely balance clamping forces through the use of a common manifold and allows pressure to build uniformly over all of the sliding pins and associated, wedge actuated, lock pins in a manner such that pressure progressively diverts to each lock pin not yet in contact with the part and until all pins are gripping the workpiece. At that point, a uniform clamping force is achieved regardless of the contour of the part being gripped.

If the part tolerances allow, other types of spring or mechanical actuation can be employed, as they do import some deformation based on large irregularities and this may in fact be desirable in certain applications. However, and due to the reduced forces required for clamping the workpiece, the present design generates pressure equal to or greater than that achieved with only a few large clamps, with resulting reduced deformation.

Figure 4:
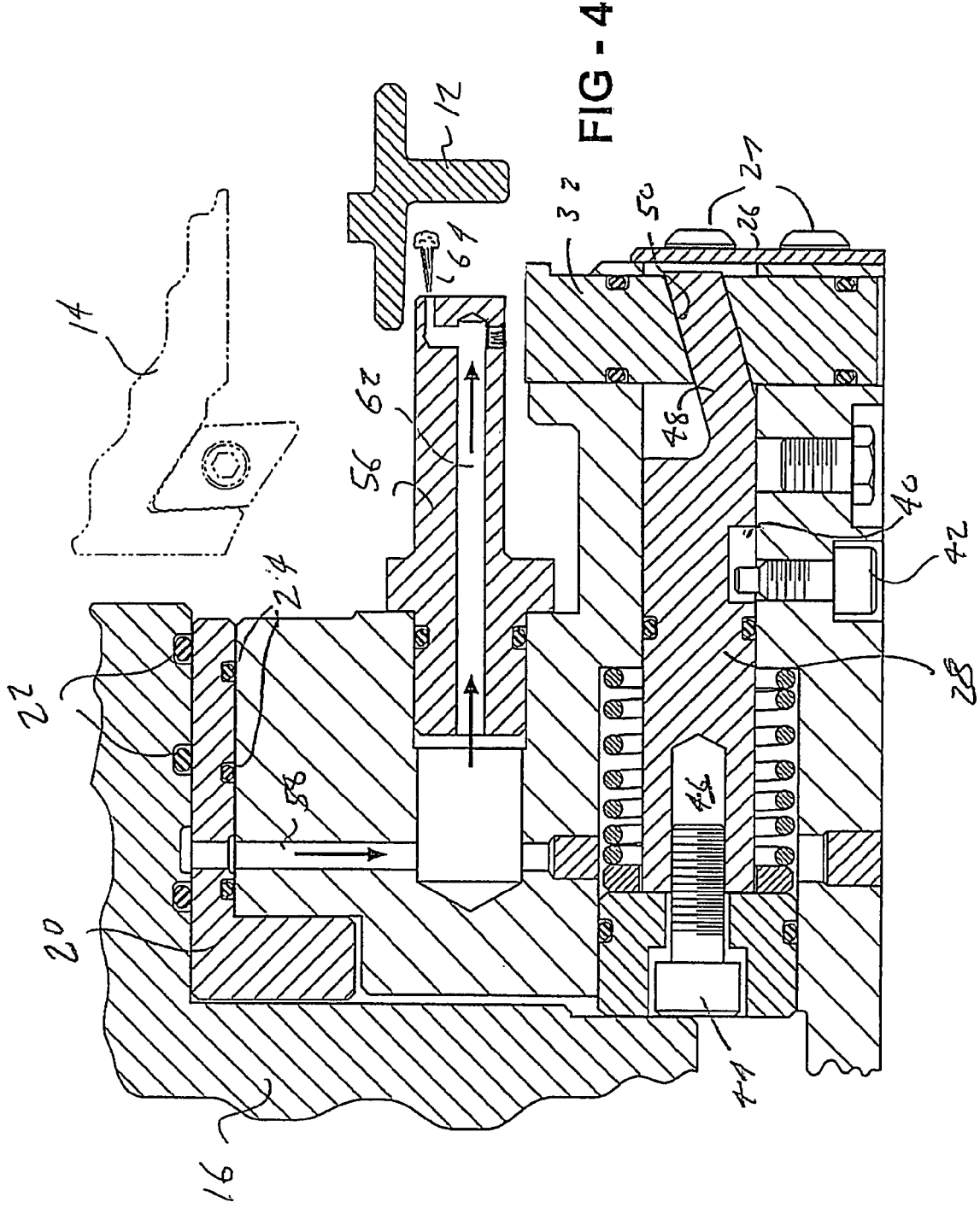
FIG. 4 is a succeeding view to that shown in FIG. 3 and illustrating a further release actuation of the selected wedge clamp and locking pin.

Referring further to FIG. 4, a view similar to that in FIG. 3 is shown in a further release actuating condition of the selected wedge clamp. This is accomplished by fluid pressure being diverted to a communicating passageway 62 defined in the fluid delivery component 56 and which includes an outlet location in communication with the workpiece (at 64).

In this manner, fluid pressure is directed (or redirected) to operate in at least one of a clamping and an actuated release condition, whereby the fluid pressure is applied in one possible variant to overcome a spring loading forced applied to the linearly traveling pin (such as illustrated at 28) to release actuate the locking pin 32. Alternatively, the fluid pressure can be applied in switching fashion between fluid driven clamping and fluid driven release conditions in the absence of any type of mechanical holding or biasing arrangement, including again spring loading of the linear slidable pins.

Figure 5:
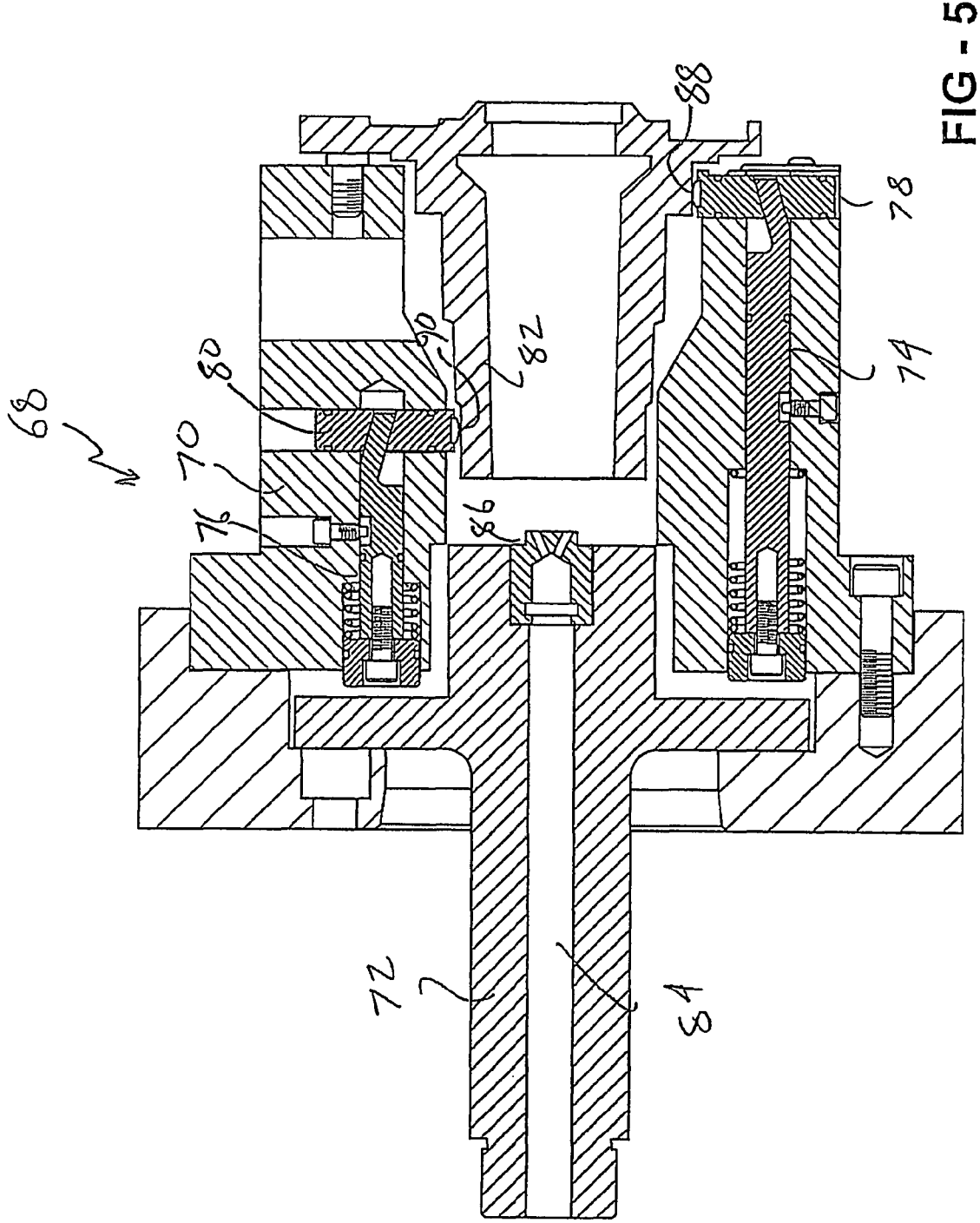
FIG. 5 is a cutaway view of an alternate embodiment of a chuck assembly, and illustrating individual wedge clamps and associated locking pins arranged in both circumferentially arrayed and linearly offset fashion to accommodate such as lengthened and irregular shaped workpieces.

Referring now FIG. 5 is a cutaway view of an alternate embodiment of a chuck assembly, and illustrating individual wedge clamps and associated locking pins arranged in both circumferentially arrayed and linearly offset fashion to accommodate such as lengthened and irregular shaped workpieces. Specifically, a modified and lengthened collet 70 is mounted in rotatable fashion relative to a fixed inner sleeve 72 and, as a consequence of its linear extending depth, is capable of supporting at least one, and typically an additional plurality, of linearly offset clamps, see as representatively shown by linearly translating pins 74 and 76 and coacting and radially displaceable lock pins 78 and 80, respectively, for securing what is typically a likewise enlarged/lengthened workpiece 82 at additional locations.

The construction of the clamps, including in particular the spring loaded nature of the linearly traversable sliding pins 74 and 76 as well as the provision of the adjustable end screws and the displacement range defining side apertures is similar to that shown and described in the initially disclosed embodiment of FIGS. 1-4, such that a repetitive description is unnecessary. A fluid pressure supply tube is also illustrated at 84 and, being similar in construction to that shown at 52 in FIG. 1, includes an end position nozzle 86.

A series of fluid passageways (not illustrated in this embodiment) extend from locations associated with the nozzle 86 to distant locations either the workpiece or associated and radially directed lock pins 78 and 80 (see as shown at 88 and 90 in FIG. 5). As disclosed in the preceding embodiment, fluid pressure (whether pneumatic or hydraulic) is contemplated to operate either separately or in combination with additional mechanical biasing/clamping means (e.g. coil springs and the like) in order to effectively clamp or disengage the wedge driven lock pins to and from the surface locations (e.g. both annularly and linearly arrayed as shown in FIG. 5) around and along the length of the workpiece 82. It is further contemplated that the invention may be configured to operate solely with mechanical biasing/clamping means (e.g., coil springs and the like) in order to effectively clamp or disengage the wedge driven lock pins to and from the surface locations (e.g. both annularly and linearly arrayed as shown in FIG. 5) around and along the length of the workpiece 82.

Having described my invention, other and additional preferred embodiments will become apparent to those skilled in the art to which it pertains, and without deviating from the scope of the appended claims.

I claim:

1. A work holder assembly for use in clamping a workpiece being machined by a tool, said assembly comprising:
   a chuck having a three-dimensional shape and size and exhibiting an annular shaped collet surrounding the workpiece to be secured;
   a plurality of individual clamps extending from circumferential spaced locations associated with said collet, said clamps each further comprising a first linear traveling component actuating a second radial traveling component into engagement with locations associated with the workpiece, said linear traveling components each further comprising an elongated and spring-loaded pin biasing against said radial traveling component;
   each of said clamps further comprising a wedge shape at an interface between said linear and radial components to minimize clamping forces and to prevent backdriving of said clamps by the tool; and
   said assembly further comprising a fluid pressure supply tube extending through a central location associated with said chuck, said collet further comprising a fluid delivery component in communication with said fluid supply tube and in contact with at least a workpiece engaging location of said radial traveling component to operate in at least one of a clamping and an actuated release condition whereby the fluid pressure is applied to overcome the spring loading forced applied to the linearly traveling pin.

2. The work holder assembly as described in claim 1, said fluid pressure supply tube having a specified shape and size and interfacing with at least one of a pneumatic or a hydraulic, or a spring clamp pressure source.

3. The work holder assembly as described in claim 2, said fluid delivery component further comprising a common and annular shaped manifold in communication with each of said plurality of clamps and in order to establish a uniform force at each clamping location.

4. The work holder assembly as described in claim 1, said chuck having a specified shape and size and comprising a fixed sleeve to which said collet is rotatably mounted.

5. The work holder assembly as described in claim 4, said fluid supply tube being generally disposed within said fixed sleeve and further comprising an outermost extending nozzle in fluid communication with at least one specified location in said collet extending to each of said clamps.

6. The work holder assembly as described in claim 4, further comprising a rotary support collar interdisposed between said fixed sleeve and rotatable collect and communicating said fluid delivery components in said clamps to said fluid pressure supply.

7. A work holder assembly for use in clamping a workpiece being machined by a tool, said assembly comprising:
   a chuck having a three-dimensional shape and size and including a fixed sleeve about which is mounted a rotatable and annular shaped collet, said collet surrounding the workpiece to be secured;
   a plurality of individual clamps extending from circumferential spaced locations associated with said collet, said clamps each further comprising a first spring biased and linear traveling component actuating a second radially traveling and adjustable component into engagement with annular disposed locations associated with a circumference of the workpiece, each of said clamps further comprising a wedge shape at an interface between said linear and radial components to minimize clamping forces and to prevent backdriving of said clamps by the tool; and
   a fluid pressure supply tube extending through a central location associated with said chuck, said collet further comprising a fluid delivery component in communication with said fluid supply tube and in contact with at least a workpiece engaging location of said radial traveling component to overcome the spring bias of said pin in a fluid actuated release condition.

8. The work holder assembly as described in claim 7, a threaded adjustment bolt extending from an end of said pin opposite said radial traveling component and defining a range of travel of said radial component.

9. The work holder assembly as described in claim 7, said linear spring loaded pin further comprising an arcuate projecting end portion, said radial traveling component further comprising a lock pin exhibiting a recessed interior through which extends said arcuate end portion of said linear traveling and spring loaded pin.

10. The work holder assembly as described in claim 7, said collet further comprising having a linear extending depth supporting at least one additional and linearly offset clamp for securing the workpiece at additional locations.

11. The work holder assembly as described in claim 7, said fluid pressure supply tube having a specified shape and size and interfacing with at least one of a pneumatic or a hydraulic pressure source.

12. The work holder assembly as described in claim 11, said fluid delivery component further comprising a common and annular shaped manifold in communication with each of said plurality of clamps and in order to establish a uniform force at each clamping location.

13. The work holder assembly as described in claim 7, said fluid supply tube being generally disposed within said fixed sleeve and further comprising an outermost extending nozzle in fluid communication with at least one specified location in said collet extending to each of said clamps.

* * * * *